Jan. 17, 1928.

L. C. HESTER

PLOW

Filed June 24, 1926

INVENTOR
L. C. Hester
BY
ATTORNEYS

Jan. 17, 1928.  L. C. HESTER  1,656,354
PLOW
Filed June 24, 1926   2 Sheets-Sheet 2
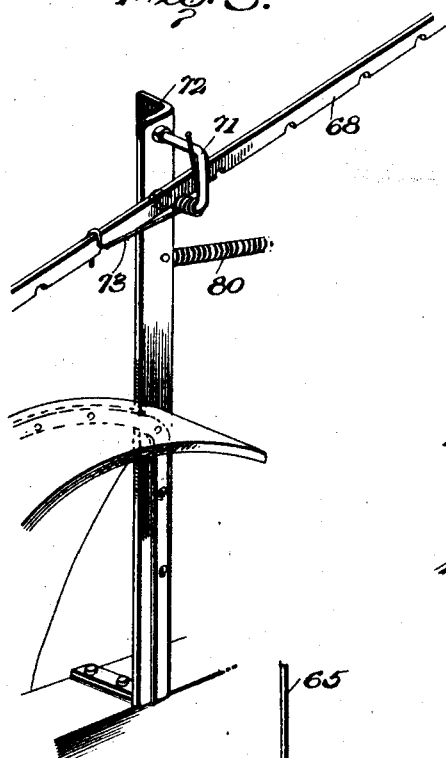
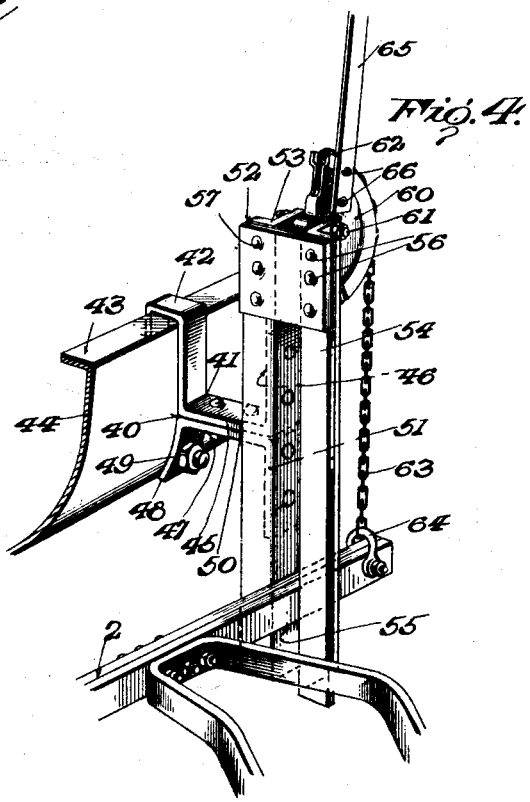
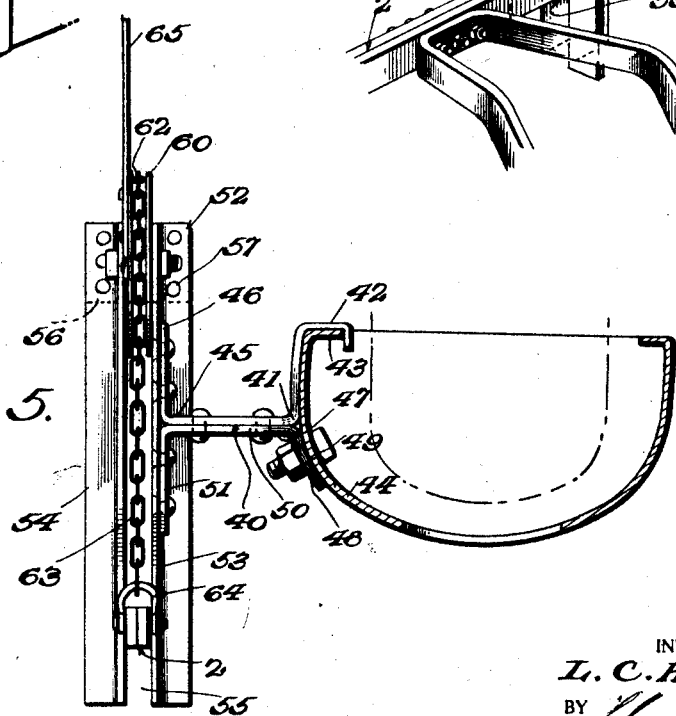
INVENTOR
L. C. Hester.
BY
ATTORNEYS Patented Jan. 17, 1928.

1,656,354

UNITED STATES PATENT OFFICE.

LEVI C. HESTER, OF JACKSONVILLE, FLORIDA.

PLOW.

Application filed June 24, 1926. Serial No. 118,290.

This invention relates in general to an improvement in plows and most particularly to an improvement in disc plows especially designed for use on tractors.

The object of the present invention resides in the provision of a plow of this character which is so constructed and organized that as many as three disc plows may be mounted on a single push bar without interferring with the control of the plow or the ease of operation. In addition to these advantages it is possible and entirely practicable to employ three disc plows without extending the front axle of the tractor on which the plow is used.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a view in side elevation showing a tractor having a plow embodying the present invention, Figure 2 is a fragmentary view in plan showing how the disc plows are mounted on the push bar.

Figure 3 is a fragmentary perspective view showing a portion of the lift support, Figure 4 is a fragmentary perspective view showing the combined guide and lift support and Figure 5 is a view partly in front elevation and partly in transverse section further illustrating the combined guide and lift support.

Referring to the drawings the numeral 1 designates generally a tractor which is of the conventional type. The present invention proposes the provision of a push bar, designated generally at 2, and which preferably consists of a number of flat pieces of metal 3 fastened together as will hereinafter more clearly appear. The rearward end of this bar is pivotally and positively mounted on any suitable part of the tractor at the rear thereof, the push bar extending forwardly along one side of the tractor as shown in the drawings. While the point of attachment of the bar 2 to the tractor may vary in the embodiment shown it is pivotally connected to lugs 4 integral with and depending from the axle housing 5, a pivot pin 6 being employed to effect pivotal connection between the bar 2 and the lugs 4. If desired the plow may be pivotally connected by suitable means with the draft hitch of the tractor.

Plow beams, designated generally at 7, 8 and 9 are mounted on the push bar 2 and have journals or boxes 10, 11 and 12 which suitably support disc plows 13, 14 and 15, respectively, the plows 13, 14 and 15 having their axes aligned. The plow beam 7 has an attaching portion 16 fastened to the push bar 2 by means of rivets 17 which also serve to secure the pieces 3 of the bar 2 together. Forwardly of the attaching portion 10 the plow beam 7 is made of reversely inclined portions 18 and 19, said portions 18 and 19 being connected by a double connecting portion 20. The inclined portion 19 of the beam 7 terminates in an attaching foot 21 secured to the push bar 2 by bolts and nuts 22.

The plow beams 8 and 9 are preferably constructed of a single piece of bar stock, the plow beam 8 being constituted by an inclined portion 23 of said bar stock, the inclined portion 23 extending substantially parallel to the inclined portion 19. The bar of metal which makes up the plow beam 9 has a rearwardly inclined portion 24 between the portion 23 and an attaching portion 25 secured by bolts and nuts 26 to the push bar 2. Forwardly of the attaching portion 25 the bar stock making up the plow beams 8 and 9 has an outwardly and forwardly inclined connecting and offset portion 27, at the outer end of which an outwardly and rearwardly inclined portion 28 is provided. It is this portion 28 which carries the journal 12 for the disc plow 13 and this portion 28 is substantially parallel to the inclined portions 23 and 19 on which the disc plows 13 and 14, respectively, are mounted.

In order to brace the inclined portions 19, 23 and 28 to better adapt them to sustain the stresses incident to the plowing operation a brace member 30 is provided and includes a bridge portion 31 and depending arms 32, 33 and 34 fixedly connected to the portions 19, 23 and 28, respectively, of the plow beams 7, 8 and 9. The portion 33 is bifurcated at its upper end and the sections of the bifurcated end, designated at 33ª, merge into the bridge portion 31. The bridge portion 31 overlies the disc 13 and 14 and the arms extend down behind the discs with which they are associated.

Adjacent the forward end of the tractor a bracket, designated generally at 40, in mounted on the body of the tractor and as shown in Fig. 3 this bracket 40 includes a member 41 having a U-shaped clip 42 engaging over the flange 43 of the housing section 44 of the tractor housing. This member 41 has an outwardly extending portion 45 terminating in an upstanding attaching portion 46. The bracket 40 is completed by means of a bracing member 47 having a curved portion 48, bolted, as at 49, to the housing 44. The bracing member 47 also has an outwardly extending portion 50 and a depending attaching portion 51, the attaching portions 56 and 51 being vertically aligned. On the attaching portions 41 a combined lift support and guide, designated generally at 52, is mounted. This lift support and guide 52 includes an angle bar 53 bolted or riveted to the attaching plates 46 and 51. A second angle bar 54 is provided in conjunction with the bar 53 and extends parallel thereto to define a guide slot 55 in which the forward end of the push bar 2 is fitted for vertical swinging movement. The bar 54 is held and supported by means of a plate 56 riveted, as at 57, to the bar 53 and, as at 58, to the bar 54. On the upper ends of the bar 54 a lift sector 60 is pivotally mounted, as at 61. This lift sector has its periphery provided with a groove 62. To one end of the lift sector a chain 63 is secured, the chain 63 extending around the groove 62 of the sector and having its lower end pivotally connected, as at 64, to the forward end of the push bar 2. A lever arm 65 has one end fixed by means of bolts or rivets 66 to the sector 60 and the opposite end of this lever is pivotally connected, as at 67, to an operating bar 68. The operating bar 68 has a handle portion 69 and intermediate its ends is provided with a series of notches 70. The bar 68 is shiftably fitted through a U-shaped guide 71 carried at the upper end of the standard 72 bolted or otherwise suitably secured to a stationary part of the tractor body. A spring 73 is associated with the guide 71 and hooks over the bar 68 to urge the bar down against the lower portion of the guide 71, thereby causing any notch 70 that may be aligned with the lower portion of the guide 71 to receive such portion of the guide whereby to hold the bar 68 in adjusted position.

For the purpose of counterbalancing the weight of the plow assembly during the lifting operation only a retractile coil spring 80 is provided and has one end connected as at 81, to the lever arm 65 and has its other end connected, as at 82, to the standard 72. When the bar 68 is swung upwardly above the pivot 67 so as to disengage the guide from the notch 70 with which it has been associated, then the spring 80 is actuated to effectively counterbalance the plow assembly since at this time the lever arm 65 may swing over the influence of the spring. This greatly facilitates the lift of the plow assembly by applying a rearward pull upon the operating bar 68. The sector 60 takes the motion of the lever arm and efficiently translates it into a quick acting lift on the plow assembly. Then when the plows are lowered into engagement with the ground the arm 65 is locked in position by the engagement of the selected notch 70 with the guide 71. This prevents the spring from tending to lift the plow at this time and the full weight of the plow assembly is effective to urge the plow down into the ground, thereby insuring the maximum depth of cut and also a uniform depth of cut. It is to be noted that any vibrations that may be set up in the wheels, axles or running gear are not transmitted to the plow assembly and consequently there will not be an uneven furrow at the same time the plow assembly is free to move up over rocks, boulders or the like that possibly might be too heavy for the plow to cut through. Another advantage which the invention possesses is that it is possible to use three disc plows without extending the front axle.

What I claim is:—

A plow for use on tractors including a push bar having its rearward end pivotally connected to the tractor, plow beams mounted on the push bar, each plow beam having an inclined portion, the inclined portions being parallel, disc plows mounted on the inclined portions, and a brace for the inclined portions including a bridge member overlying the inclined portions and the intermediate disc plows, and arms connecting with the inclined portions.

LEVI C. HESTER.